(No Model.)
J. A. FORBES.
CORN CUTTING ATTACHMENT FOR MOWING MACHINES.
No. 328,770. Patented Oct. 20, 1885.
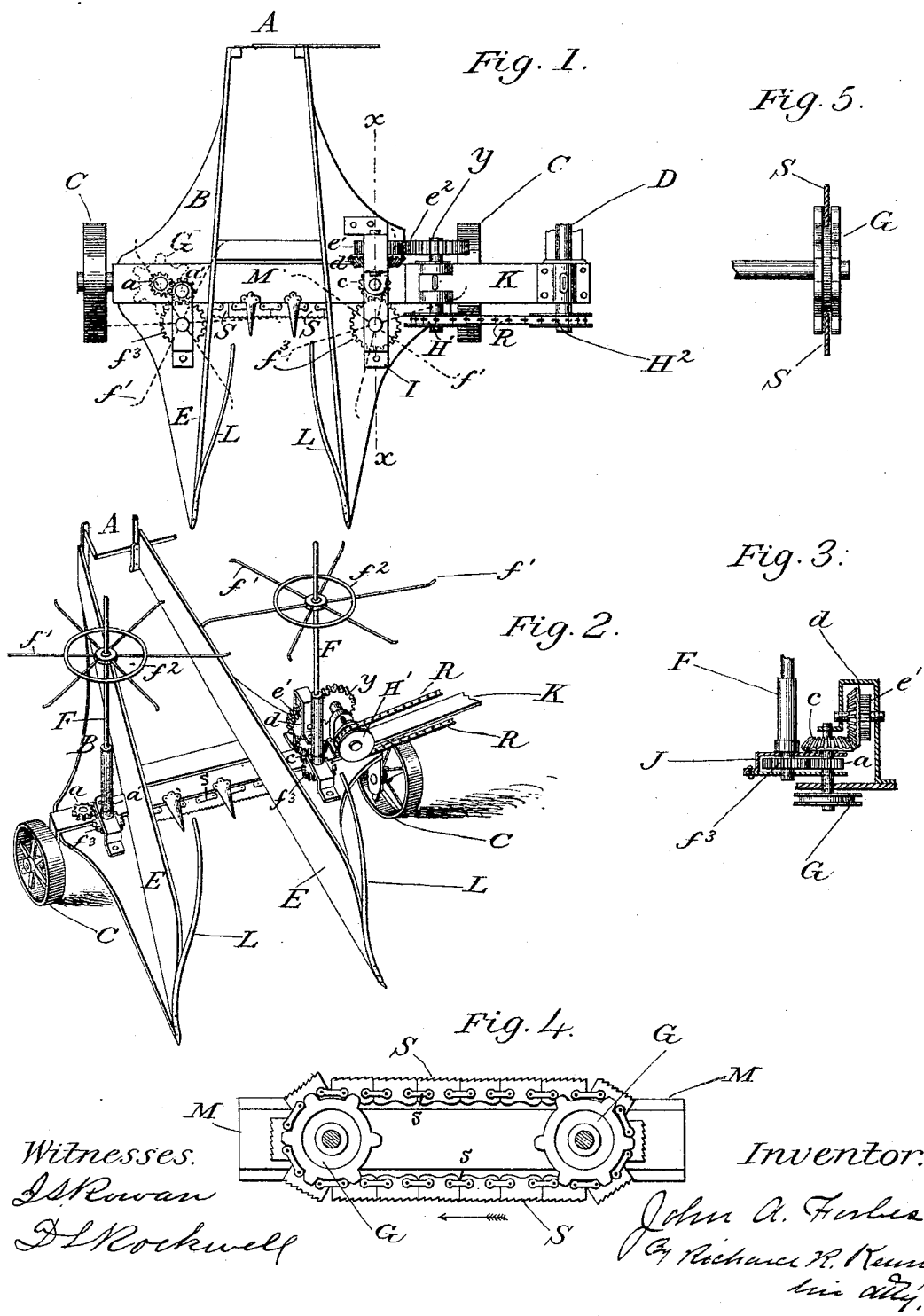
Witnesses.
Inventor.

UNITED STATES PATENT OFFICE.

JOHN A. FORBES, OF DOVER, DELAWARE, ASSIGNOR OF ONE-HALF TO EDWIN S. ANDERSON, OF SAME PLACE.

CORN-CUTTING ATTACHMENT FOR MOWING-MACHINES.

SPECIFICATION forming part of Letters Patent No. 328,770, dated October 20, 1885.

Application filed December 6, 1883. Serial No. 113,752. (No model.)

*To all whom it may concern:*

Be it known that I, JOHN A. FORBES, of Dover, in the county of Kent and State of Delaware, have invented certain new and useful improvements in Corn-Cutting Attachments for Mowing and Reaping Machines, of which the following is a full, clear, and exact description, reference being had to the accompanying drawings, and to the letters of reference marked thereon.

My invention relates especially to devices employed for cutting and harvesting corn or cane while standing in the field, and has for its object the provision of a device which may be attached to any ordinary mowing or reaping machine after the cutter-bar or platform or both have been removed.

The invention consists, essentially, in a knife or sickle made in sections, said sections being linked together, forming an endless or chain-like knife or sickle, in combination with suitable mechanism for driving said knife or sickle, and with one or more reels so arranged as to be brought near to or away from the corn or cane, as the necessity of the case may require, and also with a small platform just in the rear of the cutter-bar, which, with the latter, forms a platform for receiving the cut corn or cane as it falls, one end resting on the platform and the other on the arm of the dropper, which last is so constructed and arranged as to be tripped when a sufficient quantity of corn or cane is cut; and my invention also involves certain other novel and useful combinations or arrangements of parts and peculiarities of construction and operation, all of which will be hereinafter first fully described, and then pointed out in the claims.

In the drawings, Figure 1 is a plan view of my cutter. Fig. 2 is a perspective view thereof. Fig. 3 shows a part of the driving mechanism in elevation. Fig. 4 is a plan view of the cutting-knife and bar and the sprocket-wheels. Fig. 5 is an edge view of the sprocket-wheels.

Like letters of reference wherever they occur indicate corresponding parts in all the figures.

The operation of the machine is as follows: As the machine advances and the corn or cane is cut, it falls, one end resting on the platform and the other on the dropper A. When a sufficient quantity is resting on the platform and dropper, the dropper is tripped by means of a treadle or other suitable device, the corn or cane falling to the ground and the dropper set for the next bunch.

A is the dropper, which is made like a cross, with four arms of equal length, and is pivoted to a post attached to the near side board of the machine, and so arranged that it may be moved forward or backward, as necessity may require. A like post, with a projection at an angle, as shown in Fig. 2, is attached to the far side board, so that when the dropper is set an arm thereof will be in such proximity to the projection on the post attached to the far side board as to prevent the cut corn or cane from falling until tripped, as above described.

B are the side supports of the side boards. C C are the wheels forming a truck for supporting the device. D is the crank-shaft of a mowing or reaping machine. E E are the side boards of the device. F F are the reels for pressing the corn or cane against the knife or sickle as the machine advances. $f'$ $f'$ are the arms of the reels, and $f^2$ $f^2$ the strengthening-hoop. G G are the sprocket-wheels supported upon shafts, as shown in Fig. 4, and adapted and arranged to carry the knife or sickle S.

The sections of the knife or cutter are matched so as to fit one against the other when passing across the corn, and are held together by links $s$, so placed that the adjacent ends leave a space between them. The wheels G have toothed flanges, between which travel the sections, the teeth engaging between the ends of the links in the spaces. These wheels perform the double function of both guiding and supporting the cutter-sections.

L L are the arms or guards for pressing the corn together as it enters between the side boards. Motion is communicated from shaft D to shaft Y by means of a chain, R, passing over pulleys H' and H², a gear-pinion, $e^2$, meshing with a pinion, $e'$, the shaft bearing the latter also bearing a bevel-gear, $d$, which meshes with a corresponding pinion, $c$, upon the upright shaft bearing the gear $a$, adapted and arranged with pinion, $f^3$, upon upright shaft F.

The knife or sickle S is composed of a series of sections linked together in the form of an endless chain. The said sections may be either smooth or toothed, as shown in Fig. 4 of the drawings.

When constructed and arranged in accordance with the foregoing description, my device may be attached to any mower or reaper when the cutter-bar or platform or both have been removed.

When set in motion, the movement of the knife or sickle is as indicated by the arrow in Fig. 4, and the stalks of corn or cane being pressed against the moving knife or sickle are quickly severed, dropping upon the platform and arm of the dropper A, from whence they are dropped to the ground when a sufficient quantity has been cut.

Having now fully described my invention, what I claim as new therein, and desire to secure by Letters Patent, is—

1. A cutter consisting of a series of toothed matched sections, and links connecting said sections, so that a space is left between the adjacent ends of said links, combined with sprocket-wheels provided with toothed flanges between which the cutter-sections travel, the said teeth engaging in the space between the said ends of the links, substantially as and for the purpose specified.

2. An improved transmitting-gear for corn-harvesters, consisting of an upright shaft carrying a sprocket-wheel imparting motion to the cutter, and also carrying a pinion and bevel-gear, an upright shaft carrying a reel and pinion, an intermediate combined bevel-gear and pinion, and a shaft with a gear-wheel meshing with said pinion and receiving its movement from the source of power, substantially as and for the purpose specified.

3. An attachment for harvesters, consisting of a frame mounted upon wheels, converging guides on said frame, upright reel-shafts, a cutter consisting of a series of toothed matched sections connected by links, with spaces between their adjacent ends, wheels for the cutter, having toothed flanges, and a train of gearing, imparting simultaneous movement to the cutters and reels, substantially as and for the purpose specified.

In testimony that I claim the foregoing I have hereunto set my hand in the presence of two witnesses.

JOHN A. FORBES.

Attest:
  H. W. EVANS,
  R. R. KENNEY.